Nov. 23, 1943.　　　F. E. CERISANO　　　2,335,170
FLEXIBLE COUPLING
Filed Nov. 28, 1941
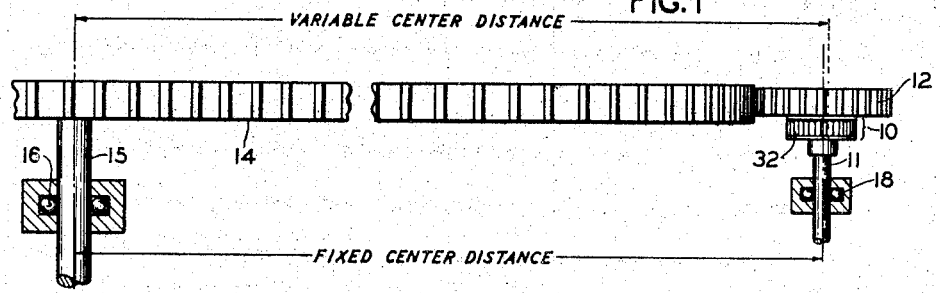
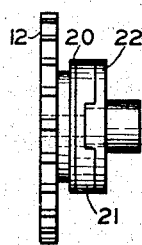
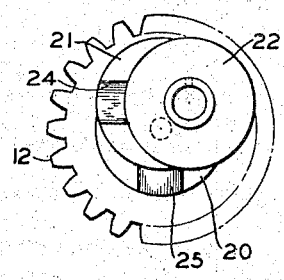
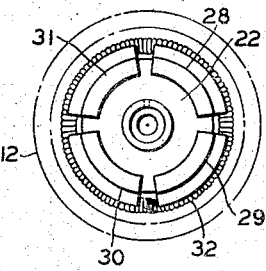
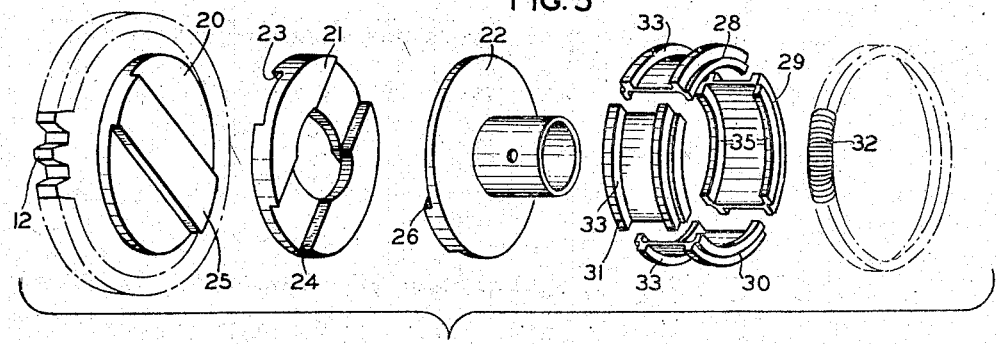
INVENTOR
FRANCIS E. CERISANO Patented Nov. 23, 1943

2,335,170

UNITED STATES PATENT OFFICE 2,335,170

FLEXIBLE COUPLING

Francis E. Cerisano, Bronx, N. Y., assignor to Sperry Gyroscope Company, Inc., Brooklyn, N. Y., a corporation of New York Application November 28, 1941, Serial No. 420,758

6 Claims. (Cl. 64—31)

This invention relates to flexible couplings and particularly to couplings of this character which permit variance in the center distance between the parallel axes of the rotatably mounted members with which it is employed. When the coupling is utilized with rotatable members in the form of gears, all backlash or lost motion therebetween may be eliminated without causing binding at any point.

An object of the invention is to provide flexibility between two rotatably mounted motion transmitting members or gears which due to irregularity in the pitch or contacting radius of the members may be subject to binding or sticking at certain portions of the peripheral area thereof when the shaft mountings for the same are rigidly maintained. Such difficulties chiefly arise when one of the motion transmitting members is of relatively large size in comparison with the other member, the larger member by reason of problems present in its manufacture not being provided with a perfectly uniform pitch or contacting radial dimension around its entire circumferential surface.

An important feature of the invention is contained in the provision with the flexible coupling of a yielding means by which the longitudinal axis of the coupling is maintained in alignment with the axes of the normally coaxial rotatable members which it connects.

Another object of the invention is to provide a coupling of this character which permits the assembly of the motion transmitting members thereof without requiring a refined adjustment of the parts.

Other objects, features and structural details of the invention will be apparent from the following description when read in connection with the accompanying drawing, wherein Fig. 1 is an elevation view showing one way in which the improved flexible coupling may be employed for use with a driver gear and a driven gear whose axes are arranged in parallel relation.

Fig. 2 is a partial detail side elevation view of the coupling.

Fig. 3 is a plan view of the parts of the coupling shown in Fig. 2 in which the same have been moved to an extreme position to illustrate the manner in which the coupling operates.

Fig. 4 is a plan view of the complete coupling, and

Fig. 5 is an exploded view in perspective showing each of the separate parts of the coupling in detail.

With reference to Fig. 1, the flexible coupling constructed in accordance with the present invention is indicated generally at 10, the same being located on the shaft 11 of a driven member or gear 12. Driven member 12 is of relatively small pitch diameter when compared with a member or gear 14 which preferably constitutes the driver member in the illustrated arrangement of parts in this figure. The rotatable mounting for member 14 includes a shaft 15 and suitable bearing member 16. As herein illustrated, gears 12 and 14 are situated in the same horizontal plane. A bearing 18 receives the shaft 11 of the driven member 12. The axes of shafts 11 and 15 are arranged in parallel relation and the center distance therebetween fixed with the members 12 and 14 joined at the smallest measured dimension of the pitch radius of the large gear 14. Because of the flexible coupling 10, while the center distance between the shafts 11 and 15 remains fixed, the center distance between the parallel axes of the driver and driven members 14 and 12, respectively, is permitted to vary in accordance with the actual pitch radius of the portion of member 14 engaging member 12. Member or gear 12 consequently moves to the right as viewed in Fig. 1, in the plane of the paper to assume a position accommodating the large member 14. The coupling 10 provides means which normally maintains the member 12 and shaft 11 in coaxial relation so that the gear 12 will return to its initial starting position when the large member 14 permits this movement. As a consequence there is no lost motion or backlash between the illustrated gear or pinion members 14 and 12 which would be the case if the coupling were not employed. If the members 14 and 12 were mounted with a fixed center distance therebetween, the same would be positioned to contact at the approximate average pitch radius of the large gear 14. On either side of this average pitch radius dimension, which would be difficult to determine accurately in setting up the parts, it is apparent that there would be considerable undesired lost motion or play between the respective motion transmitting members.

In Figs. 2 to 5, inclusive, the driven member or gear 12 may be mounted on a short stub shaft extending from the center of the circular coupling part 20 which stub shaft is normally maintained in alignment with shaft 11. It is preferred, however, to form the coupling part 20 as an integral spaced part of rotatable member 12 and it is illustrated in this manner in the drawing. The flexible coupling also includes a central circular part designated at 21 and a further part 22 of similar shape in which the shaft 11 is suitably secured by means of a set screw connection. Two grooves 23 and 24, arranged perpendicular to one another are situated in the opposite faces of the disclike central part 21. A tongue which fits the respective grooves is provided on the surface of parts 20 and 22 as indicated at 25 and 26, thereon. Tongue 25 fits within groove 23 and tongue 26 fits within groove 24. When assembled for use, the noted parts join and form a coupling which has a cylindrically shaped exterior body which is concentric to the longitudinal axis thereof. The cooperating parts 20, 21 and 22 are arranged for relative movement in parallel planes with respect to one another so that the same permit displacement of the driven member 12, as shown in Fig. 3, from an axially aligned position in coaxial relation to shaft 11, the coupling maintaining the parallel relationship of the axis of gear 12 with respect to shaft 15 at all times. The peripheral surface of the axially displaced, radially movable, interfitted coupling parts may be formed in any desired geometrical shape which is symmetrically arranged about the longitudinal axis of the parts.

With a cylindrically shaped coupling, it is necessary to use centering means in the form of segment members 28, 29, 30 and 31, the interior faces of which engage all of the coupling parts 20, 21 and 22, which parts are of the same outside diameter, so that these movable parts are maintained in a longitudinally aligned position in which the common axis thereof is coaxial with the axis of shaft 11 and the shaft or axis of the gear 12. The annularly arranged segment members in the shown preferred form of the invention are spaced about the periphery of the coupling parts and are yieldably held thereagainst by means of a spring 32 which encircles the coupling and is confined thereon by the channels 33 located on the exterior surface of each of the segment members. Each of the segment members is also constructed to include rim portions as designated at 35 by means of which the movable parts 20, 21 and 22 of the coupling are maintained in cooperative relationship. The uniform pressure of the spring 32 exerted on the segment members 28 to 31, inclusive, normally retains the movable coupling parts in the centralized position shown in Figs. 2 and 4.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A flexible coupling, for normally axially aligned rotatable members, having three cooperating parts arranged for relative movement in parallel planes with respect to one another, and yieldable centering means engaging the peripheral surface of the respective cooperating parts for normally maintaining the parts in a longitudinally aligned position in which the axis thereof is aligned with the axes of the rotatable members.

2. A flexible coupling having a number of circularly shaped, longitudinally positioned, movable parts of the same outside diameter, segment members engaging the parts and arranged in spaced relation about the circumference thereof, and spring means common to said segment members for normally maintaining the movable parts of the coupling in longitudinally aligned relation.

3. A flexible coupling, for normally axially aligned rotatable members, having a number of cooperating parts arranged for relative movement in parallel planes with respect to one another, and radially urged, yieldable, centering means peripherally engaging the respective cooperating parts to maintain the same in aligned relation and coaxial with the rotatable members.

4. A coupling, as claimed in claim 3, in which said cooperating parts are cylindrical in shape and the centering means consists of a number of spaced segment pieces which engage the circumferential surface of the cooperating parts.

5. A flexible coupling having a number of axially displaced, radially movable, interfitting parts with a normally common axis and periphery, a number of annularly arranged segment members engaging the peripheral surfaces of the parts, and a spring wound around the annularly arranged segment members.

6. A flexible coupling having a number of axially displaced, radially movable interfitting parts with a normally common axis and periphery, a number of members arranged in encircling and engaging relation to the peripheral surfaces of the parts, and yielding means for positioning said members to maintain the engagement thereof with the parts.

FRANCIS E. CERISANO.